(12) United States Patent
Imhof

(10) Patent No.: US 7,055,878 B2
(45) Date of Patent: Jun. 6, 2006

(54) MULTIPURPOSE TRAILER SYSTEM

(76) Inventor: Rudy F. Imhof, 5349 Cingmars Rd., Littlefork, MN (US) 56653

( * ) Notice: Subject to any disclaimer, the term of this patent is extended or adjusted under 35 U.S.C. 154(b) by 0 days.

(21) Appl. No.: 10/902,706

(22) Filed: Jul. 29, 2004

(65) Prior Publication Data

US 2006/0022477 A1 Feb. 2, 2006

(51) Int. Cl.
B60P 3/35 (2006.01)
B62D 33/08 (2006.01)
B62C 1/06 (2006.01)

(52) U.S. Cl. .................................................. 296/26.07

(58) Field of Classification Search ............. 296/26.07, 296/26.06, 26.01, 24.3, 24.32, 24.33, 156, 296/158, 168, 172, 173; 276/26.04, 26.05; 298/17 R, 22 R, 19 R, 17 B, 17 S, 17 SG; 278/19 R, 17 B, 17 S, 17 SG
See application file for complete search history.

(56) References Cited

U.S. PATENT DOCUMENTS

| | | | | |
|---|---|---|---|---|
| 2,729,497 A | * | 1/1956 | Runyan | 296/171 |
| 2,843,418 A | * | 7/1958 | Gray | 296/173 |
| 3,902,616 A | * | 9/1975 | Santic et al. | 414/420 |
| 4,456,272 A | | 6/1984 | Kroeger | 280/12 |
| 4,626,166 A | * | 12/1986 | Jolly | 414/812 |
| 4,719,716 A | | 1/1988 | Chrisley, Jr. | 43/1 |
| 5,000,645 A | * | 3/1991 | Polojarvi | 414/471 |
| 5,862,827 A | | 1/1999 | Howze | 135/901 |
| 6,017,081 A | | 1/2000 | Colby | 296/173 |
| 6,286,269 B1 | | 9/2001 | Marcum | 52/79.5 |
| 6,286,891 B1 | * | 9/2001 | Gage et al. | 296/166 |
| 6,439,645 B1 | | 8/2002 | Pederson | 296/161 |
| 6,550,575 B1 | | 4/2003 | Spencer et al. | 182/63.1 |
| 6,666,490 B1 | * | 12/2003 | Thacker | 296/26.07 |
| 6,712,421 B1 | * | 3/2004 | Wilson | 296/165 |
| 6,789,829 B1 | * | 9/2004 | Kapels | 296/11 |
| 6,802,327 B1 | * | 10/2004 | Koss | 135/88.08 |
| 6,817,677 B1 | * | 11/2004 | Beiler | 298/22 C |
| 6,945,743 B1 | * | 9/2005 | Sherman et al. | 414/476 |
| 2003/0000769 A1 | | 1/2003 | Pyle | 182/63.1 |
| 2003/0034205 A1 | | 2/2003 | Spencer et al. | 182/63.1 |
| 2003/0140573 A1 | | 7/2003 | Marcinowski et al. | 52/79.5 |
| 2004/0018075 A1 | | 1/2004 | Sherman et al. | 414/476 |
| 2004/0055630 A1 | | 3/2004 | Olson | 135/901 |
| 2004/0069338 A1 | | 4/2004 | Koss | 135/88.08 |
| 2004/0227369 A1 | * | 11/2004 | Davidson et al. | 296/26.07 |

* cited by examiner

Primary Examiner—H Gutman
(74) Attorney, Agent, or Firm—Michael S. Neustel

(57) ABSTRACT

A multipurpose trailer system for providing a trailer, a fish house, a deer stand, and a scaffold within a single structure. The multipurpose trailer system includes a frame with a plurality of wheels, a housing, a plurality of first arms and second arms pivotally connected between the frame and the housing, and a plurality of actuators attached between the frame and the first arms for elevating/lowering the housing with respect to the frame. A control unit is utilized for controlling the position of the actuators. The frame includes a pair of support members for supporting an ATV upon in front of the housing when the housing is in a lowered position.

20 Claims, 8 Drawing Sheets

MULTIPURPOSE TRAILER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to Ice Houses and Deer Stands and more specifically it relates to a multipurpose trailer system for providing a trailer, a fish house, a deer stand, and a scaffold within a single structure.

2. Description of the Related Art

Conventional trailers, fish houses, deer stands and scaffolds have been in use separately for years. Conventional trailers are typically comprised of a frame with a plurality of wheels and a platform for supporting objects to be transported. Conventional fish houses may either be a foldable structure or a solid structure that have a plurality of holes for ice fishing through. Conventional deer stands are either a portable structure (e.g. tree stands) or a permanently raised structure. Conventional scaffolding is comprised of a portable structure that is assembled on a job site to elevate workers. However, no one has combined a trailer, fish house, deer stand and scaffold together as explained further by this invention.

In these respects, the multipurpose trailer system according to the present invention substantially departs from the conventional concepts and designs of the prior art, and in so doing provides a trailer, a fish house, a deer stand, and a scaffold within a single structure.

BRIEF SUMMARY OF THE INVENTION

The present invention provides a new multipurpose trailer system construction wherein the same can be utilized for providing a trailer, a fish house, a deer stand, and a scaffold within a single structure. The general purpose of the present invention, which will be described subsequently in greater detail, is to provide a new multipurpose trailer system that has many of the advantages of the conventional fish houses, deer stands, scaffolds and trailers mentioned heretofore and many novel features that result in a new multipurpose trailer system which is not anticipated, rendered obvious, suggested, or even implied by any of these devices, either alone or in any combination thereof.

To attain this, the present invention generally comprises a frame with a plurality of wheels, a housing, a plurality of first arms and second arms pivotally connected between the frame and the housing, and a plurality of actuators attached between the frame and the first arms for elevating/lowering the housing with respect to the frame. A control unit is utilized for controlling the position of the actuators. The frame includes a pair of support members for supporting an ATV upon in front of the housing when the housing is in a lowered position.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a multipurpose trailer system that will overcome the shortcomings of the prior art devices.

A second object is to provide a multipurpose trailer system for providing a trailer, a fish house, a deer stand, and a scaffold within a single structure.

Another object is to provide a multipurpose trailer system that may be used as a trailer, a fish house, a deer stand, or a scaffold.

An additional object is to provide a multipurpose trailer system that is capable of transporting objects such as an ATV.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
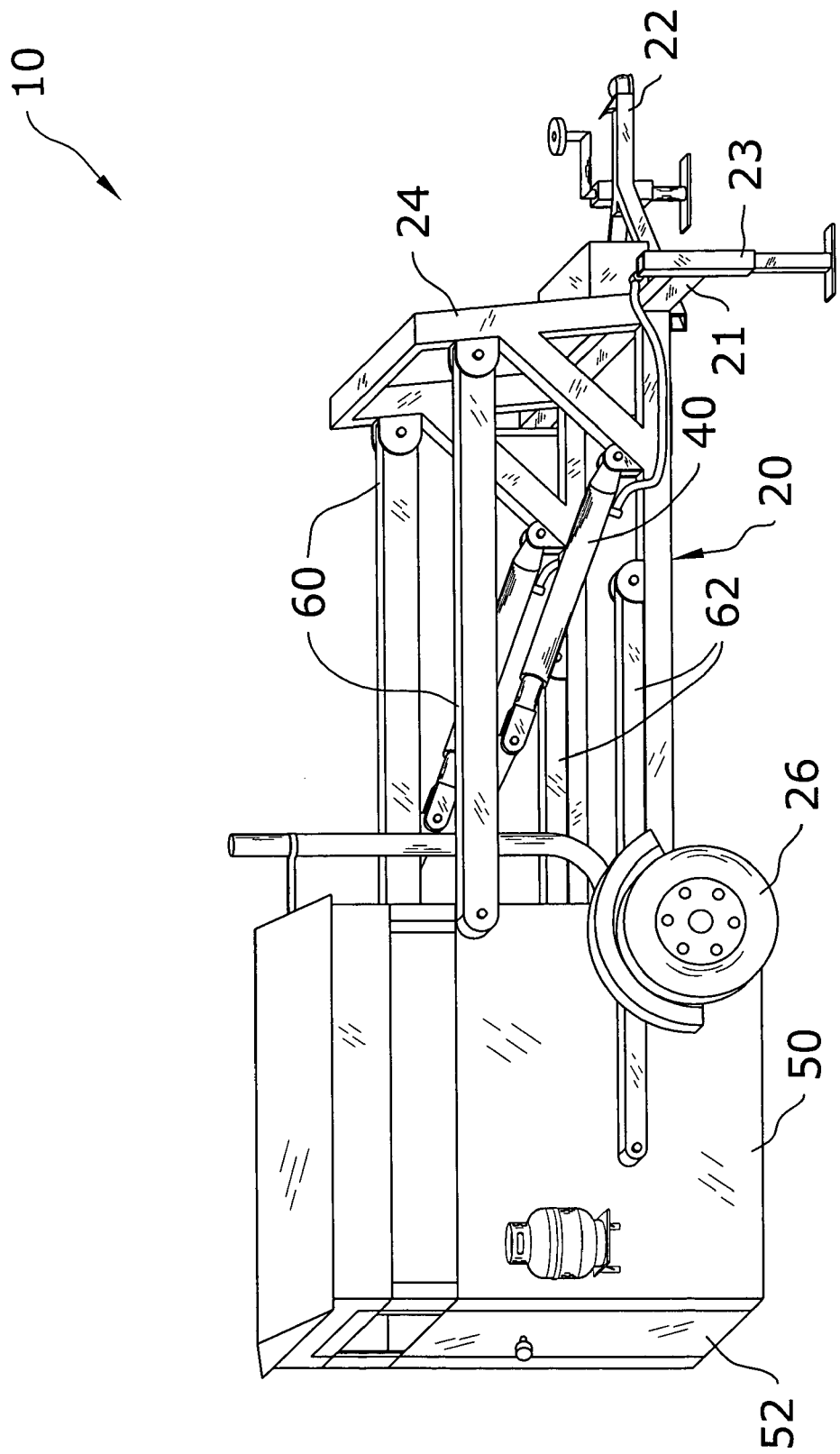
FIG. 1 is an upper perspective view of the present invention in the lowered position.

Turning now descriptively to the drawings, in which similar reference characters denote similar elements throughout the several views, FIGS. 1 through 8 illustrate a multipurpose trailer system 10, which comprises a frame 20 with a plurality of wheels 26, a housing 50, a plurality of first arms 60 and second arms 62 pivotally connected between the frame 20 and the housing 50, and a plurality of actuators 40 attached between the frame 20 and the first arms 60 for elevating/lowering the housing 50 with respect to the frame 20. A control unit 30 is utilized for controlling the position of the actuators 40. The frame 20 includes a pair of support members 28 for supporting an all terrain vehicle (ATV) 12 upon in front of the housing 50 when the housing 50 is in a lowered position.

B. Frame

Figure 6:
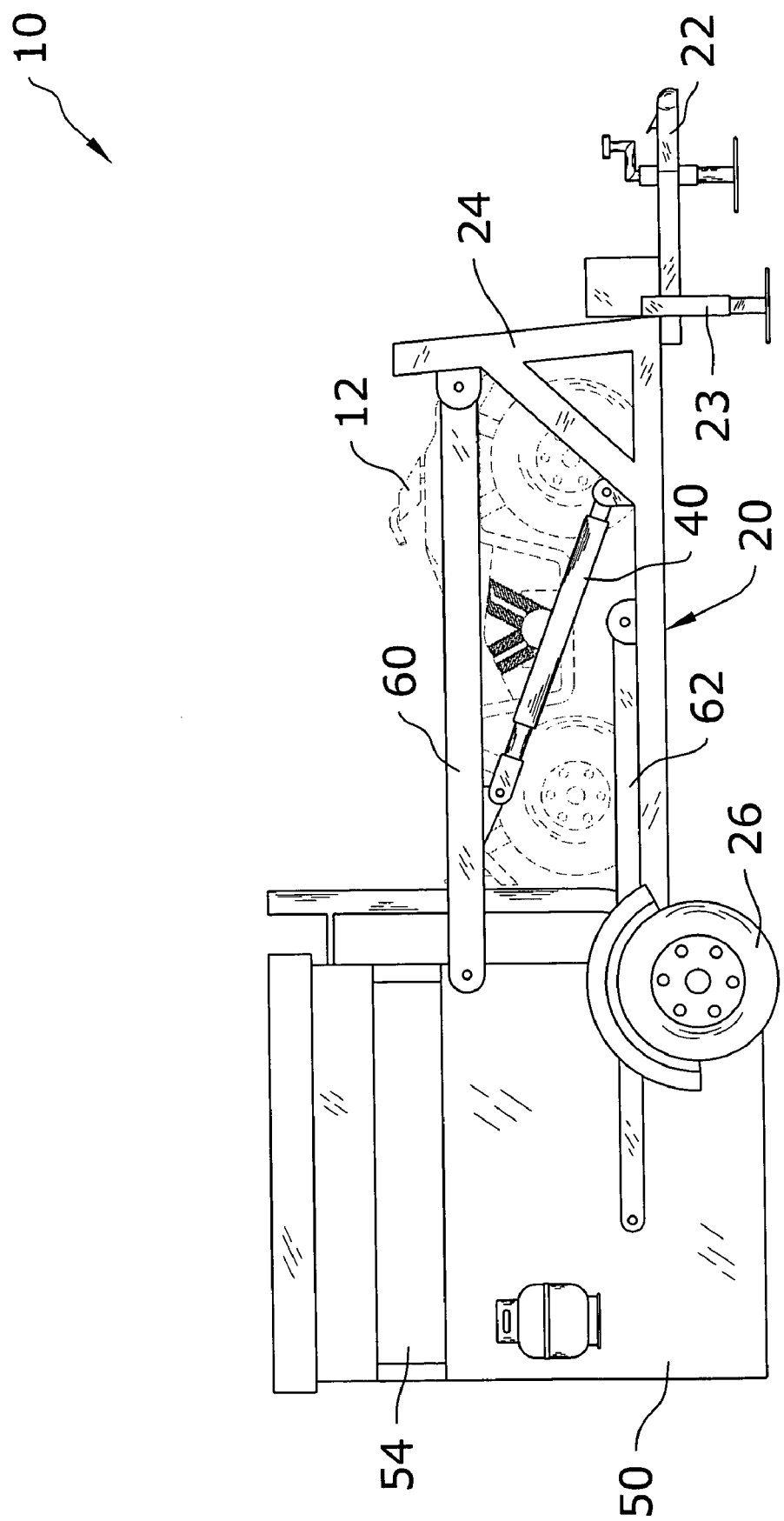
FIG. 6 is a side view of the present invention in the lowered position with an ATV loaded.
Figure 7:
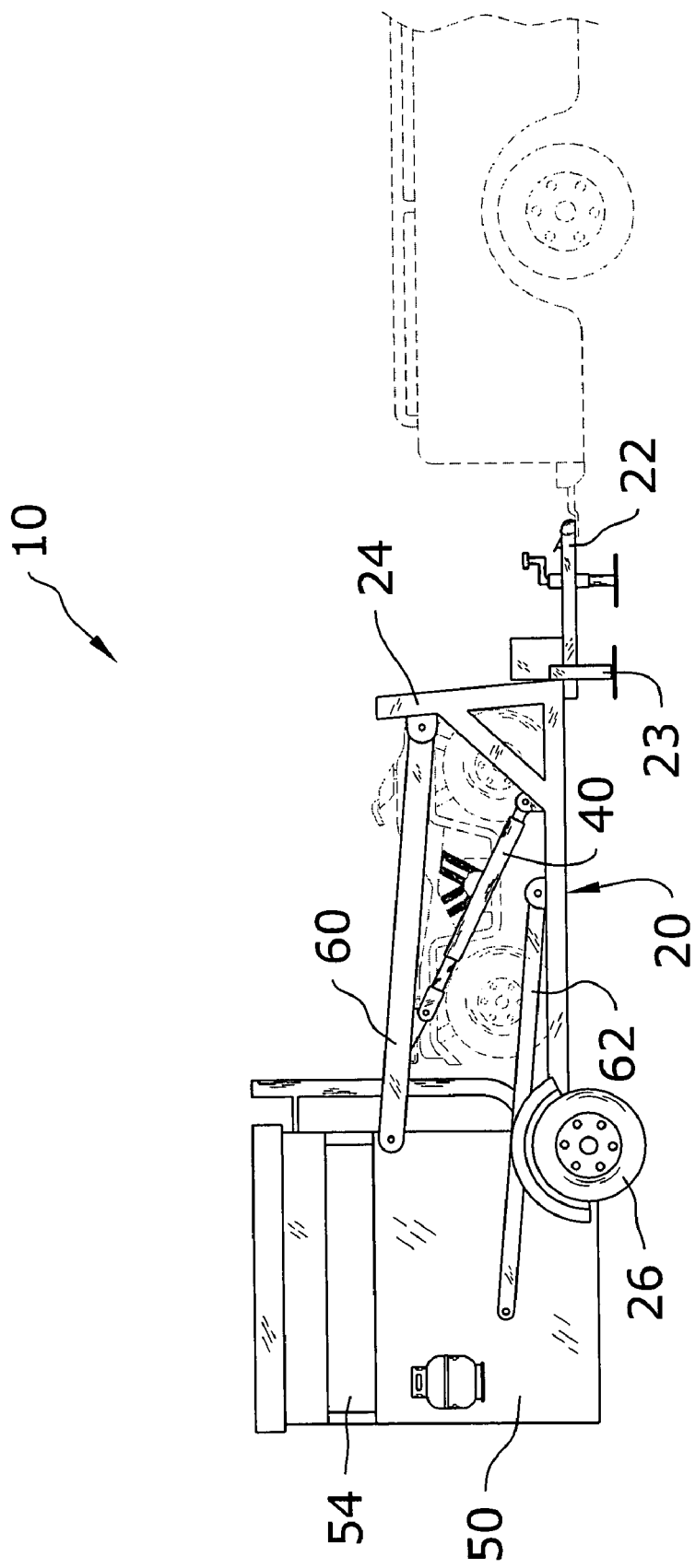
FIG. 7 is a side view of the present invention in the lowered position with an ATV loaded with the hitch attached to a vehicle.

The frame 20 may be comprised of various structures commonly utilized for trailers. FIGS. 1 through 7 illustrate an exemplary frame 20 that is suitable for the present invention. The frame 20 preferably includes a plurality of wheels 26 for allowing transporting of the present invention. The frame 20 further preferably includes a hitch 22 for connecting to a vehicle as shown in FIG. 7 of the drawings.

A front support 24 preferably extends upwardly from a front portion of the frame 20 for pivotally supporting the first arms 60 as illustrated in FIGS. 1 and 3 through 7 of the drawings. The front support 24 may be comprised of various rigid structures capable of supporting the forces applied to the same during the movement of the housing 50 from the lowered position to the elevated position.

Figure 2:
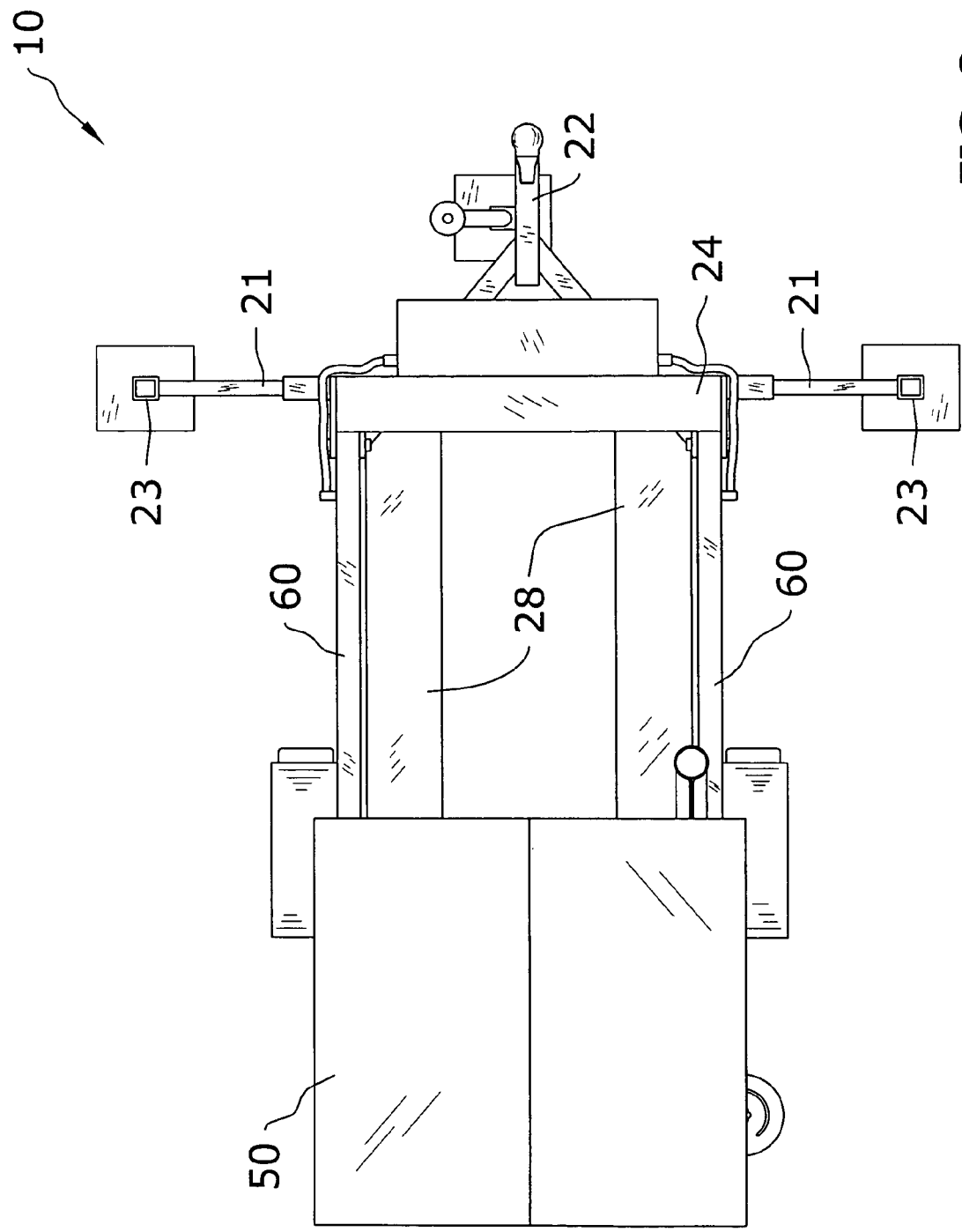
FIG. 2 is a top view of the present invention in the lowered position.

A pair of support members 28 are preferably attached to the frame 20 for supporting an ATV 12 or other object as best illustrated in FIG. 2 of the drawings. There is preferably a space between the support members 28 as shown in FIG. 2, however the support members 28 may be replaced with a single platform structure. The support members 28 are preferably positioned in front of the housing 50 when the housing 50 is in the lowered position as shown in FIG. 2 of the drawings.

C. Housing

The housing 50 preferably at least one hole for ice fishing similar to a conventional fish house. The housing 50 may also be heated and include cabinetry which are found within a conventional fish house. The housing 50 also preferably includes at least one door 52 as shown in FIG. 1 of the drawings. The housing 50 also includes at least one window (preferably at least one sliding window 54) for hunting wild game.

Figure 3:
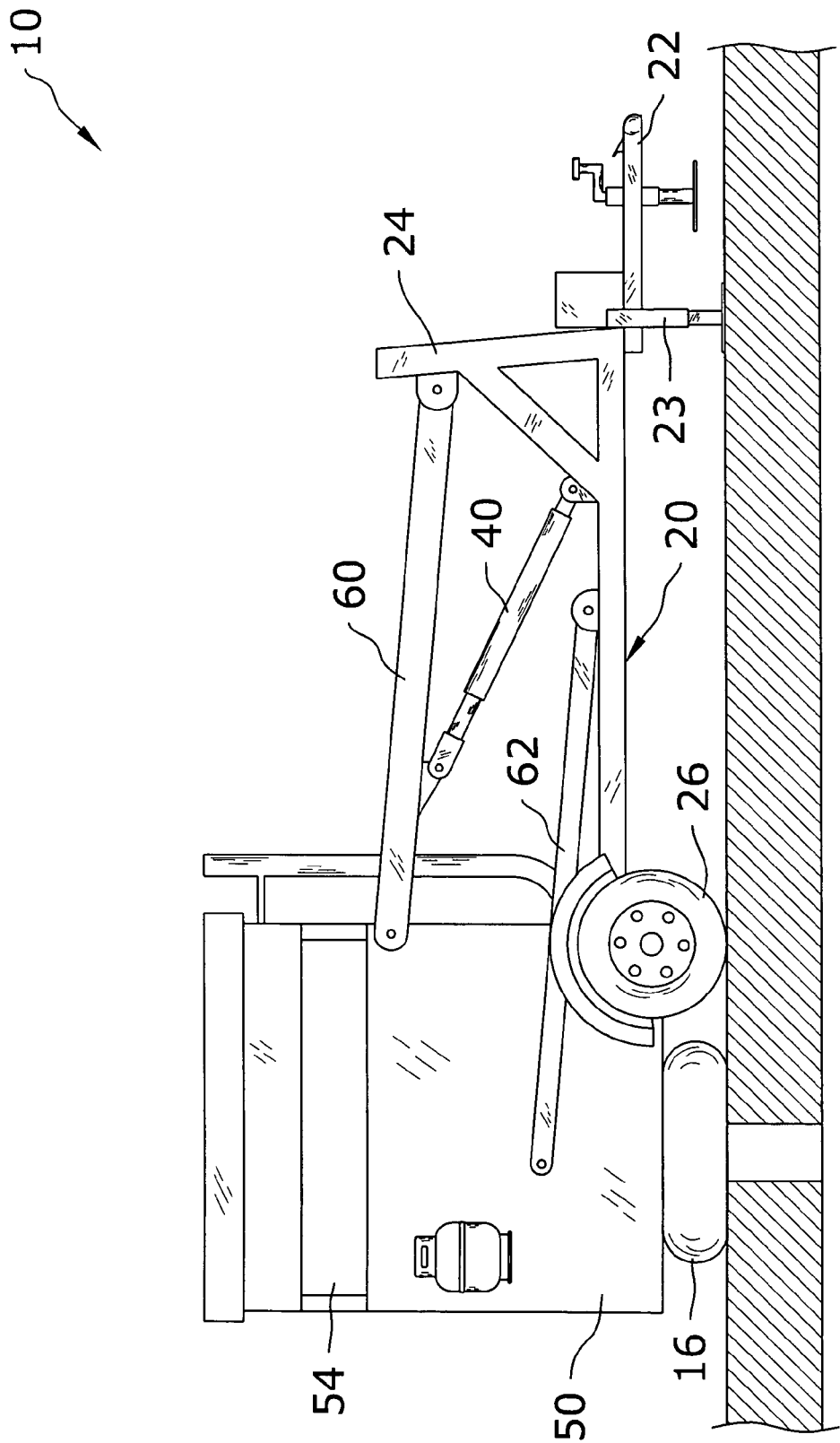
FIG. 3 is a side view of the present invention in the lowered position upon ice as a fish house.

The housing 50 is positionable in a lowered position (FIGS. 1, 2, 3, 6, 7) and an elevated position (4, 5). When the housing 50 is in the lowered position, the housing 50 is positioned behind the frame 20 as shown in FIGS. 1 and 3 of the drawings. A bottom of the housing 50 is preferably positioned approximately six inches above a surface supporting the wheels 26 when in the lowered position as shown in FIG. 3 of the drawings. As further shown in FIG. 3 of the drawings, at least one inner tube 16 (or similar seal structure) is preferably positionable between the bottom of the housing 50 about an ice hole for sealing the hole for ice fishing within the housing 50.

D. Arms

A plurality of first arms 60 are pivotally connected between the front support 24 and the housing 50 as shown in FIGS. 1 through 7 of the drawings. A plurality of second arms 62 are pivotally connected between the frame 20 and the housing 50 for supporting the housing 50 with respect to the frame 20 as further shown in FIGS. 1 through 7 of the drawings.

Figure 4:
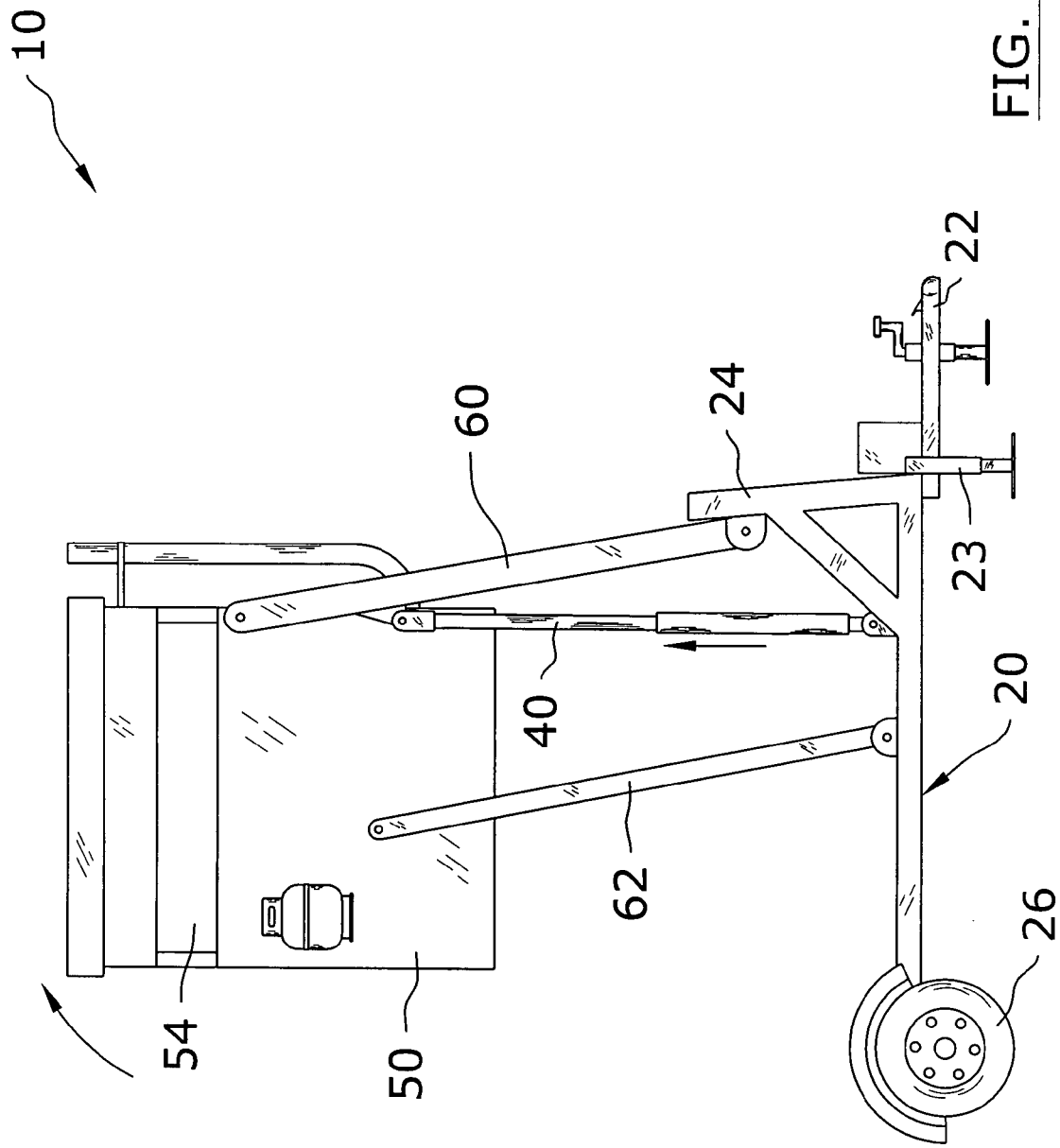
FIG. 4 is a side view of the present invention in the raised position as a deer stand.

The first arms 60 and the second arms 62 are preferably substantially parallel to one another at all times as shown in FIGS. 3 and 4 of the drawings. The first arms 60 are preferably pivotally attached to a front portion of the housing 50 and the second arms 62 are preferably pivotally attached to a rear portion of the housing 50 as shown in FIGS. 1 through 7 of the drawings.

E. Actuators

A plurality of actuators 40 are attached between the frame 20 and the first arms 60 for selectively lowering and elevating the housing 50 with respect to the frame 20 as shown in FIGS. 1 through 7 of the drawings. The actuators 40 preferably extend from the frame 20 between the first arms 60 and the second arms 62 as best illustrated in FIG. 4 of the drawings. The actuators 40 may be comprised of electrical-mechanical structures or hydraulic cylinders fluidly connected to a hydraulic system 32.

F. Side Supports

A plurality of side supports 21 preferably extend outwardly from a front portion of the frame 20 as shown in FIGS. 1 through 7 of the drawings. The side supports 21 are preferably comprised of a telescoping structure to allow for adjustment of the length of the same. Each of the side supports 21 preferably includes an adjustable jack 23 for providing support for the side supports 21. The side supports 21 provide additional support to the frame 20 when elevating/lowering the housing 50.

G. Control Unit

Figure 8:
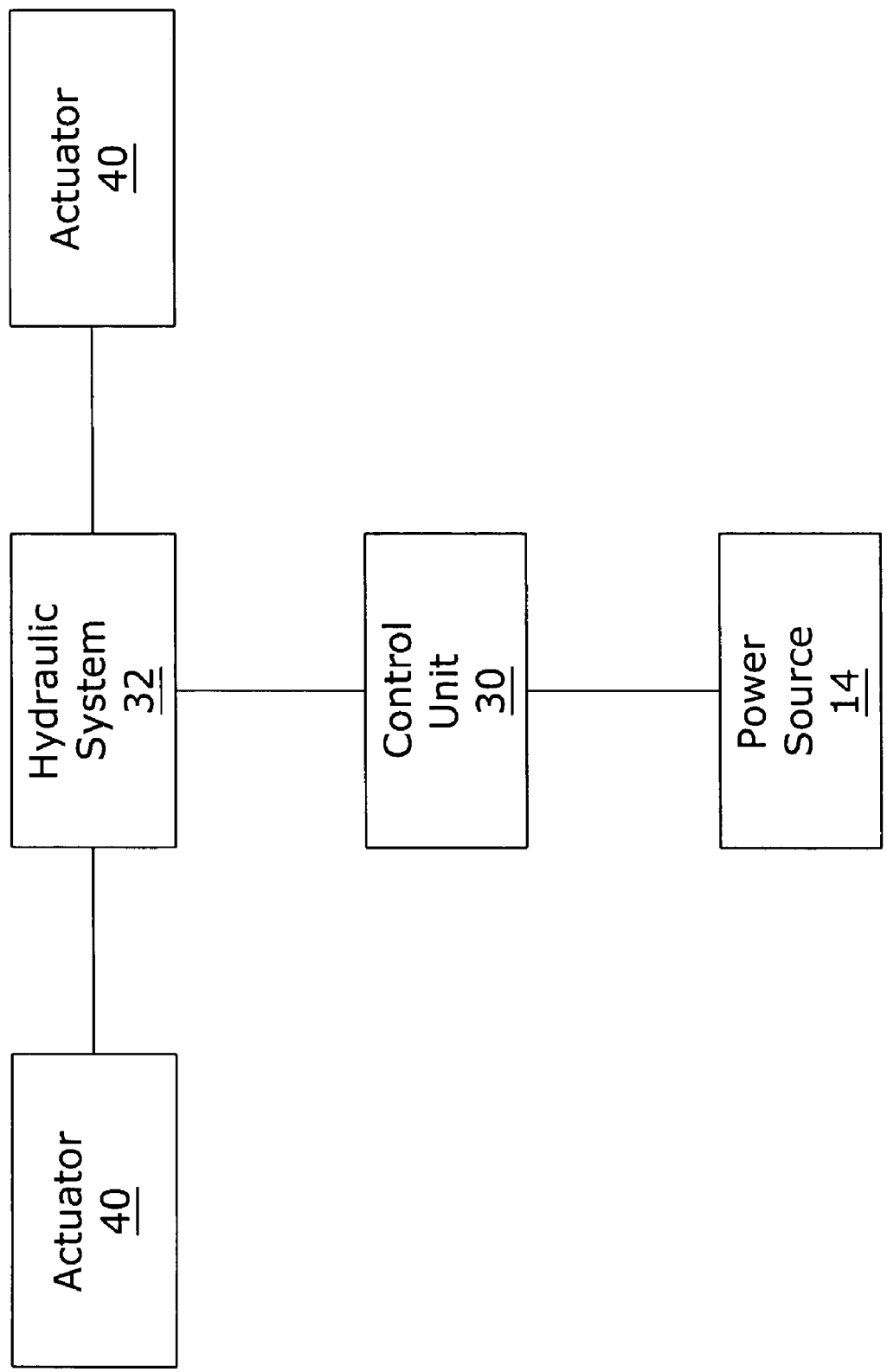
FIG. 8 is a block diagram of the present invention.

A control unit 30 is preferably in communication with the actuators 40 for controlling a position of the actuators 40 as shown in FIG. 8 of the drawings. The control unit 30 is preferably positioned within the housing 50, but may be positioned in other locations upon the frame 20. If the actuators 40 are comprised of hydraulic cylinders fluidly connected to a hydraulic system 32 as shown in FIG. 8, the control unit 30 is then in communication with the hydraulic system 32 for controlling the actuators 40. A power source 14 (e.g. battery, vehicle electrical system, etc.) is utilized to provide electrical power to the control unit.

H. Operation of Invention

FIG. 3 illustrates the present invention in a lowered position for allowing the housing 50 to be used as a fish house. Holes in the floor of the housing 50 allow fishing lines to be passed through the same. One or more inner tubes 16 seal the ice fishing hole with respect to the floor of the housing 50 as shown in FIG. 3 of the drawings.

If the user desires to utilize the present invention as a hunting stand, the user manipulates the actuators 40 to elevate the housing 50 with or without the user within the housing 50 to the elevated position as shown in FIG. 4 of the drawings. The user is then able to monitor wild game activity from a raised position. In addition, when in the raised position the housing 50 may be used as scaffolding.

Figure 5:
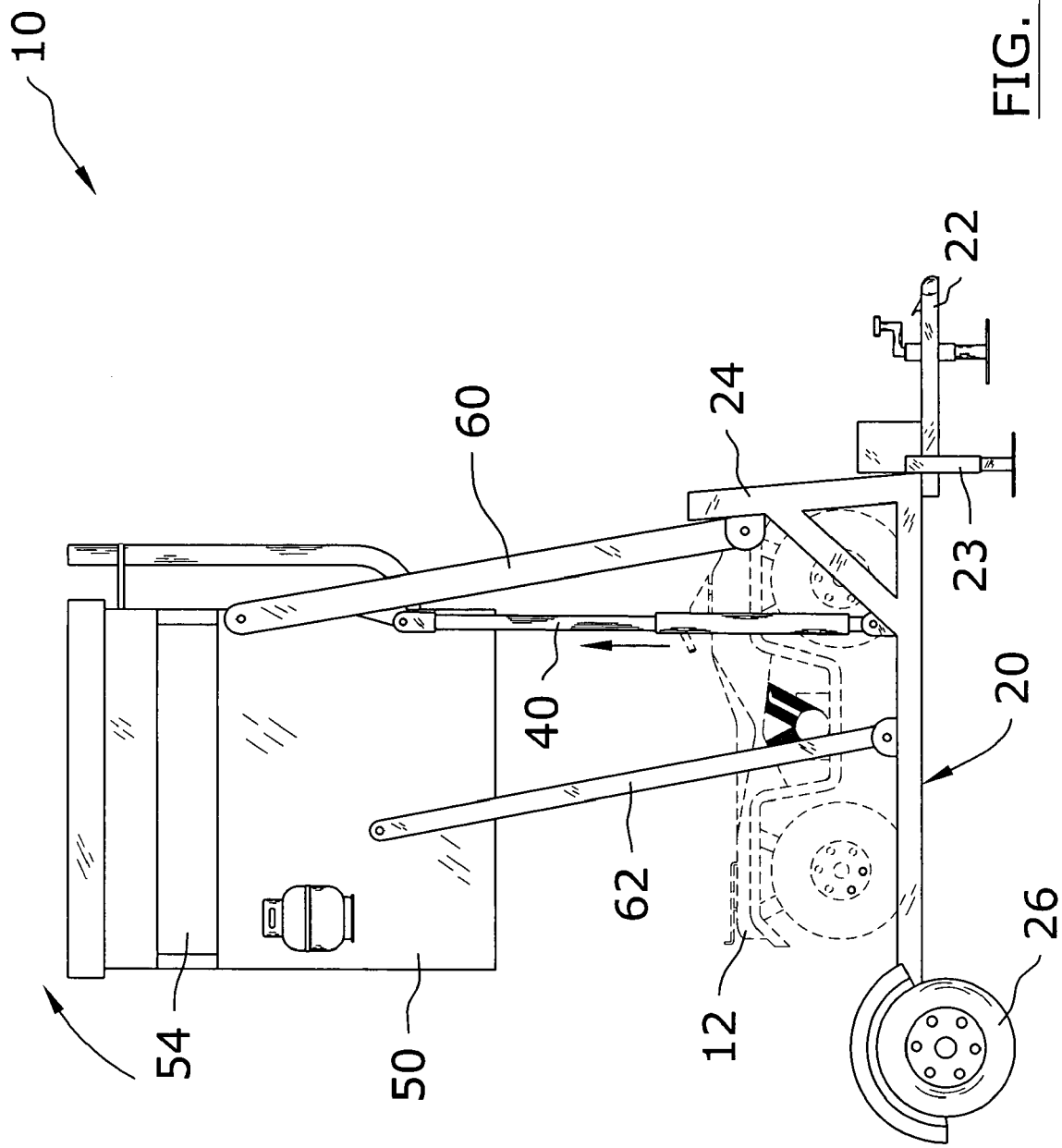
FIG. 5 is a side view of the present invention in the raised position as a deer stand and/or loading an ATV.

If the user desires to transport an ATV 12 or other object upon the frame 20, the housing 50 is manipulated to the raised position and the ATV 12 is driven upon the frame 20 to be supported by the support members 28 as shown in FIG. 5 of the drawings. The housing 50 is then lowered behind the ATV 12 to prevent the ATV 12 from falling off the frame 20 as shown in FIG. 6 of the drawings.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

The invention claimed is:

1. A multipurpose trailer system, comprising:
    a frame with a plurality of wheels;
    a housing positionable in a lowered position and an elevated position;
    a plurality of first arms and a plurality of second arms pivotally connected between said frame and said housing for supporting said housing with respect to said frame, wherein said first arms and said second arms are substantially parallel to one another; and
    a plurality of actuators attached between said frame and said first arms for selectively lowering and elevating said housing with respect to said frame;
    a front support extending from a front portion of said frame that pivotally supports an end of said first arms.

2. The multipurpose trailer system of claim 1, including a control unit in communication with said actuators for controlling a position of said actuators.

3. The multipurpose trailer system of claim 2, wherein said actuators are each comprised of a hydraulic cylinder that is fluidly connected to a hydraulic system and wherein said control unit is in communication with said hydraulic system.

4. The multipurpose trailer system of claim 1, wherein said frame includes a pair of support members for supporting an all terrain vehicle.

5. The multipurpose trailer system of claim 4, wherein said support members are positioned in front of said housing when said housing is in said lowered position.

6. The multipurpose trailer system of claim 1, wherein said frame includes a plurality of side supports.

7. The multipurpose trailer system of claim 6, wherein said side supports are comprised of a telescoping structure.

8. The multipurpose trailer system of claim 6, wherein said side supports each include a jack.

9. The multipurpose trailer system of claim 6, wherein said side supports extend outwardly from a front portion of said frame.

10. The multipurpose trailer system of claim 1, wherein said first arms are pivotally attached to a front portion of said housing and wherein said second arms are pivotally attached to a rear portion of said housing.

11. The multipurpose trailer system of claim 10, wherein said actuators extend from said frame between said first arms and said second arms.

12. The multipurpose trailer system of claim 1, wherein said lowered position of said housing is comprised of said housing positioned behind said frame.

13. The multipurpose trailer system of claim 12, wherein a bottom of said housing when in said lowered position is approximately six inches above a surface supporting said wheels.

14. The multipurpose trailer system of claim 13, including at least one inner tube positioned between said bottom of said housing about an ice hole.

15. The multipurpose trailer system of claim 1, wherein said housing includes at least one hole for ice fishing.

16. The multipurpose trailer system of claim 1, wherein said housing includes at least one door.

17. The multipurpose trailer system of claim 1, wherein said housing includes at least one sliding window.

18. A multipurpose trailer system, comprising:
    a frame with a plurality of wheels;
    a pair of support members for supporting an all terrain vehicle;
    a housing positionable in a lowered position and an elevated position;
    a plurality of first arms and a plurality of second arms pivotally connected between said frame and said housing for supporting said housing with respect to said frame; and
    a plurality of actuators attached between said frame and said first arms for selectively lowering and elevating said housing with respect to said frame.

19. A multipurpose trailer system, comprising:
    a frame with a plurality of wheels;
    a front support extending from a front portion of said frame that pivotally supports an end of said first arms;
    a housing positionable in a lowered position and an elevated position;
    a plurality of first arms and a plurality of second arms pivotally connected between said frame and said housing for supporting said housing with respect to said frame; and
    a plurality of actuators attached between said frame and said first arms for selectively lowering and elevating said housing with respect to said frame.

20. A multipurpose trailer system, comprising:
    a frame with a plurality of wheels;
    a housing positionable in a lowered position and an elevated position, wherein said lowered position of said housing is comprised of said housing positioned behind said frame;
    a plurality of first arms and a plurality of second arms pivotally connected between said frame and said housing for supporting said housing with respect to said frame; and
    a plurality of actuators attached between said frame and said first arms for selectively lowering and elevating said housing with respect to said frame.

* * * * *